W. WALKER.
COTTON SPRAY.
APPLICATION FILED SEPT. 27, 1912.
1,071,486.
Patented Aug. 26, 1913.
2 SHEETS—SHEET 1.
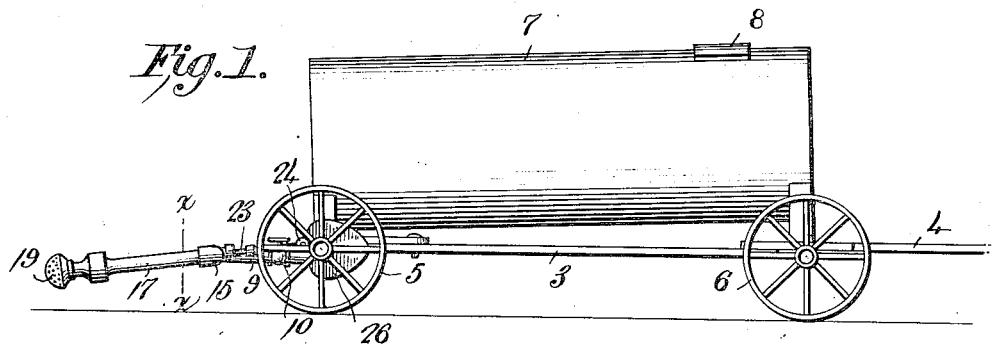
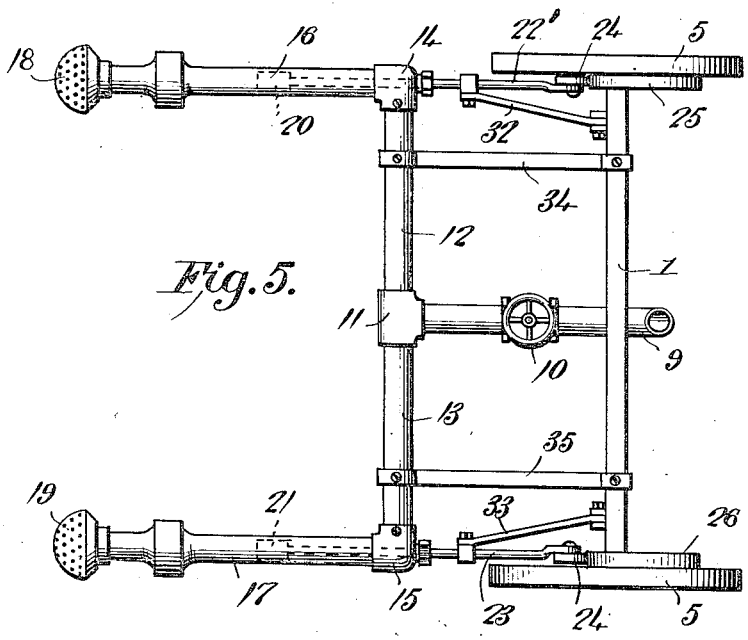
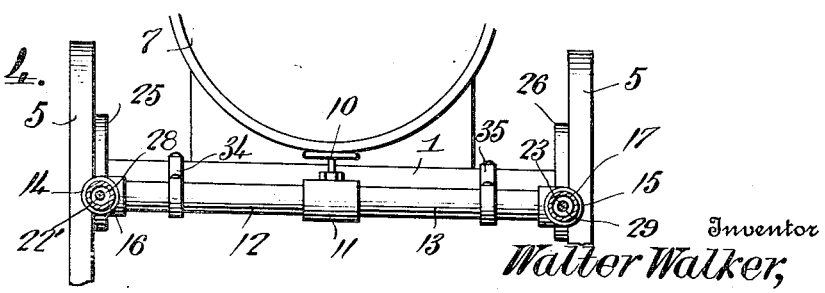
Witnesses
Carroll Bailey
Inventor
Walter Walker,
By Victor J. Evans
Attorney

W. WALKER.
COTTON SPRAY.
APPLICATION FILED SEPT. 27, 1912.

1,071,486.

Patented Aug. 26, 1913.

2 SHEETS—SHEET 2.

Witnesses
Carroll Bailey

Inventor
Walter Walker,
By Victor J. Evans
Attorney

UNITED STATES PATENT OFFICE.

WALTER WALKER, OF ADMIRAL, TEXAS.

COTTON-SPRAY.

1,071,486.

Specification of Letters Patent.

Patented Aug. 26, 1913.

Application filed September 27, 1912. Serial No. 722,756.

*To all whom it may concern:*

Be it known that I, WALTER WALKER, a citizen of the United States, residing at Admiral, in the county of Callahan and State of Texas, have invented new and useful Improvements in Cotton-Sprays, of which the following is a specification.

The present invention relates to spraying devices for destroying insect life which infest plants.

The device is primarily intended for spraying cotton plants, and is so constructed and arranged as to travel over the plants, and to spray the said plants from opposite sides.

The invention consists in the construction, combination and arrangement of parts set forth in the following description and falling within the scope of the appended claims.

Figure 2:
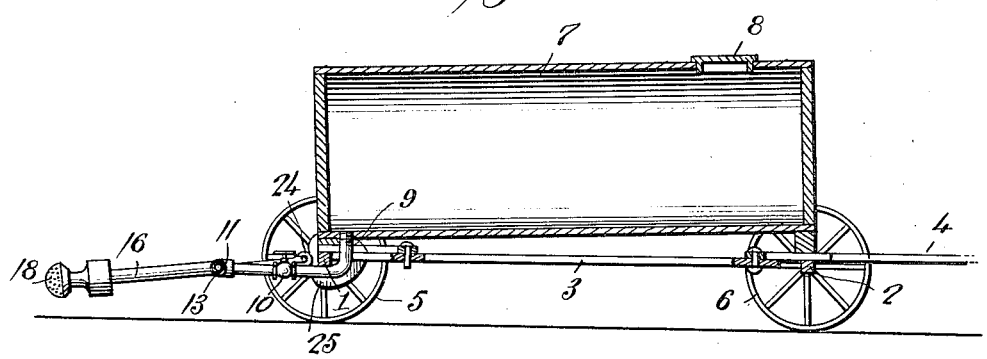
Figure 3:
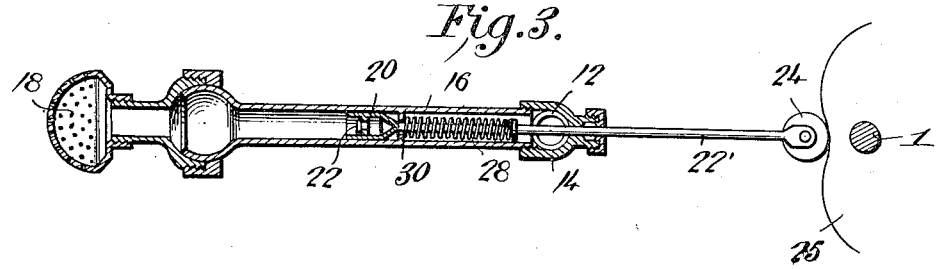

In the drawings, Figure 1 is a side elevation of a device constructed in accordance with the present invention. Fig. 2 is a central longitudinal sectional view through the same. Fig. 3 is a detail longitudinal sectional view taken through one of the outlet pipes and spraying nozzle attached thereto, as well as through the axle of the rear wheel of the machine. Fig. 4 is a transverse sectional view taken approximately upon the line X—X of Fig. 1. Fig. 5 is a plan view of the improvement in applied position on the rear axle of a truck, and showing the cams of the wheels co-acting with the plunger rods, the remainder of the running gear and the tank being removed.

The device contemplates the employment of a wheeled truck upon which is mounted a tank which is adapted to contain an insect destroying fluid. The truck embodies a rear axle 1, a front axle 2, a central reach or connecting bar 3, as well as the front hounds to which the reach 3 is connected, and the truck or running gear is also provided with a suitable tongue or shaft 4 for the draft animal. Both the front and rear axles 1 and 2 are provided with the usual wheels 5 and 6, and the said wheels are of a diameter sufficient to elevate the running gear or truck a distance away from the ground to insure the same against contact with the plants between which the wheels travel. It will be thus noted that the running gear is arranged at a considerable distance from the ground, and also that the wheels are comparatively close together. While such a structure is desirable, when the wheels travel upon the opposite sides of the plants, it is obvious that the running gear may be so arranged as to permit of the wheels traveling between opposite rows of plants, and one of the nozzles which will presently be described will spray one of the rows of plants, while the second nozzle will spray the adjacent row.

Arranged upon the front and rear axles and supported upon the running gear in any desired or preferred manner is the tank 7. This tank is preferably in the form of a cylinder having closed ends and the tank is preferably inclined from the front axle 2 to its connection upon the rear axle 1. The tank has its upper portion provided with a suitable opening which is closed through the medium of a door 8, the said opening providing means whereby insecticide may be deposited within the tank, and also whereby the poison may be stirred or mixed. Leading from the bottom of the rear closed end of the tank 7 is a pipe 9, the same being provided with a controlling valve 10. This pipe has its end provided with a T coupling 11, whereby opposite and angular pipe sections 12 and 13 are connected with the pipe 9. Suitable couplings 14 and 15 are arranged upon the ends of the pipe sections 12 and 13, and connected with the said couplings are longitudinally extending pipe members 16 and 17 respectively. The couplings 14 and 15 are so arranged as to permit of the tilting or inclination of the pipes 16 and 17, and to retain the same at a desired angle with relation to the pipe sections 12 and 13. Connected with the ends of the pipes 16 and 17 are spray nozzles 18 and 19. These nozzles are rotatably mounted upon the respective pipe sections 16 and 17 and are provided with suitable means for sustaining the said nozzles at a proper inclination with relation to either of the said pipes. Each of the nozzles includes a head which has an outer rounded face that is perforated, and which is provided with a non-perforated funnel-shaped rear portion or wall, connected with the face and designed to direct the fluid at an angle to said face.

Arranged within the respective pipe members 16 and 17 are plungers 20 and 21. Each of the plungers is formed with an opening which is controlled by a flap valve 22, each of the said flap valves opening toward its respective nozzle. Secured to the plungers 20 and 21, and extending through the couplings 14 and 15 are the plunger stems 22' and 23 respectively. The couplings are provided with suitable packing boxes through which the stems 22' and 23 pass, and each of the said stems has its outer extremity provided with a pivoted wheel 24. The rear wheels 5 of the running gear are provided with substantially heart-shaped cams 25 and 26, and the wheels 24 of the stems 22' and 23 are normally forced against the said cams through the medium of springs 28 and 29 which surround the said stems and exert a pressure thereon to force the said wheels against the cams.

In the showing of the drawings, a spring is arranged upon each of the plungers 10, and each of the springs exerts a tension between a flange 30, arranged within the respective pipe, and a suitable collar secured to the respective plunger stem.

In order to sustain the stems in proper working position with relation to the cams 25 and 26, the rear of the machine is provided with suitable guiding supports 32 and 33, and the pipe sections 12 and 13 may be suitably braced by members 34 and 35 which connect the said pipes with the rear axle of the frame.

With the parts positioned as shown in Fig. 3, the movement of the truck will result in the rotation of the cam 25, thereby forcing the stem 22' and its piston 20, against the action of the spring 28, toward the nozzle, the valve 22 closing and the water in advance of the piston being thus delivered under pressure to the said nozzle. The continued movement of the cam again brings its depressed portion to the starting position, thus permitting the spring to return the piston also to the starting position, the flap valve 22 opening to permit a free passage through the piston of the water received from the tank by way of the pipe 9.

Having thus described the invention, what I claim is:—

1. In an apparatus for the purpose set forth, a wheeled truck, an inclined tank upon the truck, a valved outlet pipe communicating with the tank, oppositely disposed pipe sections connected with outlet pipe, couplings adjustably connected with the said pipe sections, a longitudinally arranged pipe connected with each of the couplings, a spray nozzle rotatably connected with each of the said longitudinal pipes, a plunger within each of the longitudinal pipes, each of the plungers being provided with an opening, a flap valve for each of the openings, stems for the plungers, said stems projecting through the couplings, springs for normally forcing the plungers toward the couplings, and cam members provided upon the rear wheels and adapted to co-act with the extending ends of the stems.

2. In an apparatus for the purpose set forth, a wheeled truck, an inclined tank upon the truck, a valved outlet pipe for the tank, transversely arranged pipe sections connected with the outlet pipe, a coupling for each of the said pipe sections, longitudinally arranged pipes connected with the respective couplings, spray nozzles for the respective pipes rotatably secured thereon, each of the spray nozzles including a head having a bulging perforated face and having a funnel-shaped rear portion connected with the face, a plunger within each of the said longitudinal pipes and having its stem extending through the coupling, each of said plungers having a valve opening, the extensions of the stems being provided with rollers, guides for the said stems, heart-shaped cams provided upon the rear wheels and co-acting with the rollers, and spring members for the stems, adapted to force the rollers thereof into engagement with the cams of the wheels.

In testimony whereof I affix my signature in presence of two witnesses.

WALTER WALKER.

Witnesses:
　Oscar L. Black,
　W. F. Jones.